Figure 1:
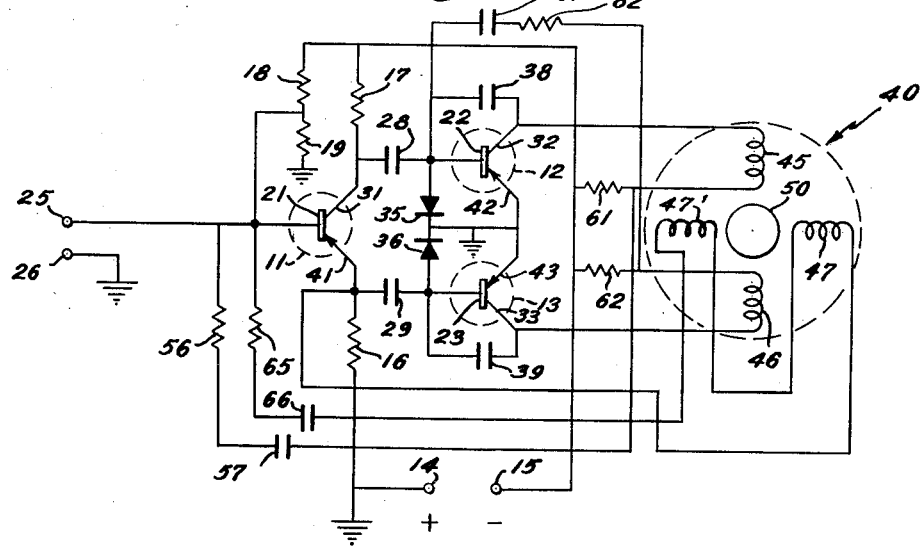

Nov. 26, 1957 R. WILLIAMS 2,814,769
ELECTRONIC POWER SUPPLY AND CLOCK MOTOR
Filed May 25, 1955

Inventor,
Reade Williams,
by Laurence R. Kempton Att'y.

United States Patent Office 2,814,769
Patented Nov. 26, 1957

---

2,814,769

ELECTRONIC POWER SUPPLY AND CLOCK MOTOR

Reade Williams, Framingham, Mass., assignor to General Electric Company, a corporation of New York Application May 25, 1955, Serial No. 511,015

9 Claims. (Cl. 318—171)

This invention relates to a synchronized electronic oscillator for powering a small alternating current motor, and more particularly, it relates to a battery operated transistor oscillator to power a clock motor.

In the copending application of T. Dreier and I. A. Terry, application Serial No. 581,139, filed April 27, 1956, now patent No. 2,786,972 and assigned to the same assignee as the present invention, there is disclosed a system for motivating clockworks which employs locally generated alternating power whose frequency is controlled by a synchronizing signal to operate a small synchronous motor at a predetermined rate of speed. The low frequency synchronizing signal is, in turn, derived from either an electric or a magnetic field produced by ordinary commercially supplied alternating power whose frequency, generally 60 cycles, is held relatively constant on the average by means of master horological control. In this way, highly accurate time indication is made possible without the necessity for a direct electrical connection to the clock.

According to one embodiment of the system disclosed in the aforementioned copending application, there is provided a battery operated low frequency oscillator to generate locally the power needed to run the motor, the oscillator frequency being effectively locked in at a predetermined value, ordinarily 60 cycles, by means of the received synchronizing signal. The present invention features an oscillator circuit specifically adapted for such use not only in that very little battery power is needed to operate it, but also because it is capable of starting the clock motor unidirectionally.

As is well known, small synchronous motors of the type generally employed in electric clocks are either of the hysteresis type or the permanent magnet type. To cause such motors to start by themselves in the proper direction, it has been found most convenient to employ shading coils to modify the stator field. Although this method of starting is quite satisfactory in conventional electric clocks, particularly those utilizing hysteresis motors, it would be ill-suited for use in the cordless clock system aforementioned for several reasons, one of which is the relatively large amount of power dissipated by the shading coils. In other words, since no external power source is to be connected directly to the clock, and primary power is to come from batteries, it is essential that the power requirements of the clock motor as well as the oscillator be made as small as possible.

To this end, in accordance with the present invention, there is provided a transistor oscillator having a phase inverter stage and a class B push-pull amplifier stage which in turn supplies power to a permanent magnet motor of special construction. Connected to the input of the phase inverter stage are two feedback circuits, one of these being supplied with current from the output of the push-pull amplifier stage and the other being supplied with current from a feedback coil magnetically coupled to the rotor of the motor. Also applied to the input of the phase inverter stage is the synchronizing signal derived as previously mentioned from a magnetic or electric field of commercial power frequency.

The operation of the oscillator and motor is featured by the use of the several input signals which the feedback circuits and the field sensing device in effect provide. When the oscillator circuit is first energized, the input signal fed back directly from the output of the push-pull amplifier stage serves to produce very low frequency oscillations, that is, oscillations of one or two cycles per second. As a result, short pulses of current are delivered to the field coils of the motor as is most effective to start it rotating. Unidirectional starting is insured by the action of the feedback coil and its associated feedback circuit. Should the rotor begin to move in the wrong direction, current induced in the rotor feedback coil will oppose the current feed back from the output of the push-pull amplifier stage, causing the low frequency oscillations to diminish until the rotor stops. Contrariwise, initial rotation in the desired direction will cause the respectve feedback currents to reinforce one another, thereby strengthening the low frequency oscillations.

As the motor picks up speed, current from the rotor feedback coil increases, whereas the current fed back from the output of the push-pull amplifier stage is caused to decrease in a manner to be described hereinafter. In this way, the frequency of the oscillator in the absence of a synchronizing signal is made to depend on the speed of the motor which, of course, will be itself dependent on the oscillator frequency. With proper regard to the phase shift vs. frequency characteristics of the oscillator as it relates to the phase of the current induced in the feedback winding by the rotor, the oscillator frequency is made to stabilize at or near the desired operating frequency, for example, 60 cycles per second. Injection of a small 60 cycle synchronizing signal then locks the oscillator frequency in at this value. It follows, therefore, that even through the synchronizing signal is cut off by a temporary power failure, for example, the motor will continue to run at very nearly the same speed so that when power is restored and the oscillator becomes locked on 60 cycles once more, little or no time deviation will have occurred.

It is an object of the present invention therefore to provide new and improved oscillatory electronic apparatus to power small synchronous motor.

It is another object of this invention to provide an oscillatory power supply with stabilized frequency to drive a synchronous clock motor so that the clock will keep approximately correct time for short time intervals.

It is also an object of this invention to provide feed back means from such motor to lock the frequency of oscillation and the speed of the motor together.

It is still another object of this invention to provide oscillatory electronic apparatus for energizing a single phase synchronous motor in a manner whereby the motor is caused to start by itself, unidirectionally.

It is a further object of this invention to provide an efficient battery operated oscillator to produce local alternating power for a clock motor, the frequency of the local power being synchronized with a signal derived from an external field of commercial power frequency.

Figure 2:
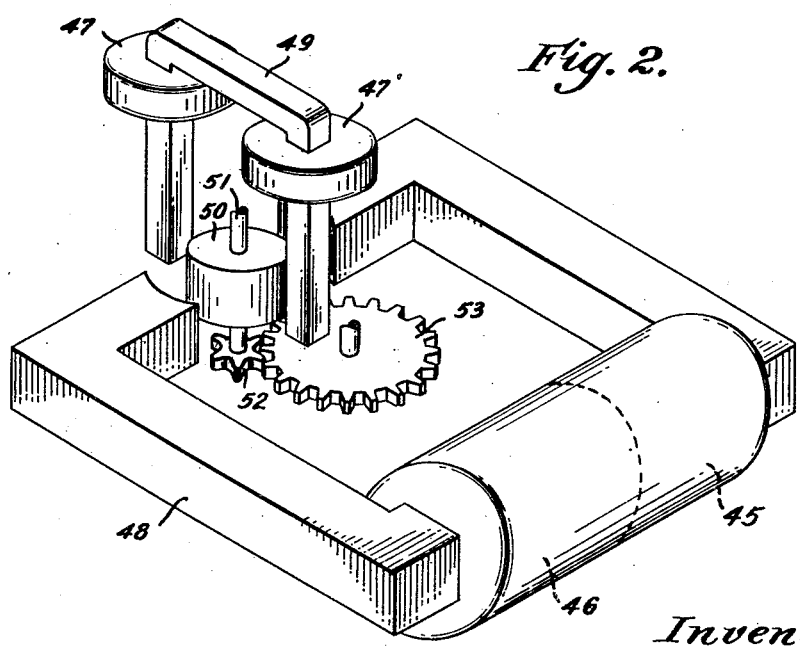

The novel features of this invention together with further objects and advantages thereof will become more readily apparent when considered in connection with the accompanying drawing, wherein:

Fig. 1 is a schematic diagram of the oscillator in accordance with the present invention; and Fig. 2 is a perspective view of the motor shown schematically in Fig. 1.

Referring now to the drawing, and more particularly to Fig. 1, it will be observed that three PNP junction transistors 11, 12 and 13 are provided according to the invention, each of the transistors having a base, a collector, and an emitter, designated 21, 31, 41; 22, 32, 42; and 23, 33, 43, respectively; and being powered by a battery (not shown) having a grounded positive terminal 14 and a negative terminal 15. Transistor 11 serves as a phase inverter and to this end a resistor 16 is connected between emitter 41 and ground, and a resistor 17 is connected between collector 31 and negative battery terminal 15. Also provided is a pair of resistors 18 and 19 in series with one another between negative terminal 15 and ground, and having their common junction point connected to base 21 of the transistor 11 for biasing the same. A pair of input terminals 25 and 26 across which the aforementioned synchronizing signal is applied are connected to base 21 of transistor 11, and to ground respectively.

Coupled to the output of the phase inverter stage by means of a pair of coupling capacitors 28 and 29 are the input circuits of transistors 12 and 13 which are arranged for push-pull class B amplifier operation. In particular, capacitors 28 and 29 are coupled between collector 31 of transistor 11 and base 22 of transistor 12, and between emitter 41 of transistor 11 and base 23 of transistor 13, respectively; and a pair of diodes 35 and 36 are connected from the respective bases 22 and 23 of transistors 12 and 13 to a common junction of their emitters 42 and 43, which is grounded. It has also been found desirable to provide capacitors 38 and 39 between the bases and collectors of transistors 12 and 13, respectively, for a purpose to be explained in detail hereinafter.

As shown diagrammatically in Fig. 1, motor 40, to be driven by the oscillator according to the invention, has a pair of like field coils 45 and 46, and in addition is provided with a pair of series connected feedback or commutator coils 47 and 47'. Field coil 45 is energized from transistor 12 by virtue of the connection between one leg of coil 45 and collector 32, and the connection of the other leg of coil 45 through a resistor 61 to negative terminal 15. Field coil 46, on the other hand, is energized by transistor 13, one leg of coil 46 being coupled to collector 33 and the other leg of coil 46 being coupled through resistor 62 to negative terminal 15.

Completing the apparatus of the invention is a pair of feedback circuits, one of these around the phase inverter and amplifier stages, and the other around the entire apparatus including the motor. To form the first-mentioned path or circuit, a current limiting resistor 56 and a coupling capacitor 57 are connected in series combination between the base 21 of transistor 11 and the junction of resistor 61 with one leg of coil 45. The second circuit referred to above includes a current limiting resistor 65 and a coupling capacitor 66 in series combination between base 21 of transistor 11 and one leg of feedback coil 47'. The other leg of coil 47' is connected to one leg of coil 47, which has its other leg connected to emitter 41 of transistor 11. Preferably, still another feedback circuit in the form of a capacitor 81 and a resistor 82 in series with one another between base 22 of transistor 12 and the junction of resistor 62 with one leg of field coil 46 is provided in order to insure that oscillation will start when the oscillator is first energized.

Motor 40 is illustrated in somewhat more detail in Fig. 2. With reference now to Fig. 2, it will be seen that motor 40 comprises a small cylindrical permanent magnet rotor 50, rigidly attached to a shaft 51. Shaft 51 in turn mounts a pinion 52 which meshes with a gear 53 forming a part of the gear train between the motor and the clock (not shown) to be driven thereby. Since rotor 50 will run at relatively high speed (3600 R. P. M. in the case of 60 cycle energization), it will, of course, be necessary to utilize additional reduction gearing, forming no part of the present invention and not shown for purposes of clarity in the drawing. A pole structure 48, around which field coils 45 and 46 are wound, provides the energizing field for the rotor 50. Oriented at right angles to pole structure 48 is an additional pole structure 49 which magnetically couples feedback coils 47 and 47' to rotor 50 but does not produce appreciable mutual coupling between the latter and field coils 45 and 46. As shown, feedback coils 47 and 47' are more or less disk-shaped and are wound around opposite legs of pole structure 49. Of course, various other types of coils and other pole structure configurations may be employed since these characteristics of the motor are not at all critical as regards the mode of operation of the apparatus according to the present invention. This will be apparent to those skilled in the art.

In operation, when the battery voltage is first applied to the oscillator it will undergo very slow oscillation producing in the field coil of the motor relatively large pulses of current whose frequency is in the neighborhood of one or two cycles a second. This is due to the combined effects of the feedback paths through coupling capacitors 57 and 81 to the phase inverter and amplifier stages, respectively, which give rise to relaxation oscillations as in a vacuum tube multi-vibrator, for example. Accordingly, a strong low frequency magnetic field will be generated across the rotor gap to cause the rotor to start. Operation in the desired direction only will take place owing to the phase relation between the feedback currents from field coil 45 and from feedback or commutator coils 47, 47'. Should the rotor 50 start to turn over in the wrong direction, or in other words, the direction which would result in the clock running backwards, the current fed back from the commutator coils will tend to cancel the current fed back from the field coil, thereby weakening the oscillations until the motor stops. Contrariwise, when the rotor begins to turn in the correct direction, the oscillation will be strengthened since the feedback currents will then aid one another.

The value of current limiting feedback resistor 65 should be made small enough in proportion to the value of resistor 56 so that the oscillator becomes relatively insensitive to feedback current through the latter as the current through the former increase with increasing motor speed. This condition is further accentuated by virtue of the voltage dividing action of resistor 61 in series with coil 45. Thus, an increase in the oscillator frequency causes more and more of the output voltage from transistor 12 to appear across field coil 45 and less and less to appear across resistor 61. It follows, therefore, that commutator coils 47, 47' will primarily control the frequency of oscillation as the rotor picks up speed, causing the frequency to increase and the rotor to continue to accelerate until an equilibrium condition is attained.

Equilibrium will be reached when the sum of the net phase shift through the oscillator and the phase shift of the current induced in the commutator coils is equivalent to zero. To cause the equilibrium speed of the motor to correspond with an oscillator frequency which is substantially the same as the frequency of the synchronizing signal, namely 60 cycles by way of example, pole structure 49 may be rotated slightly, thereby altering the phase of the current from the feedback coils. Further control of the equilibrium speed of the motor may be obtained with capacitors 38 and 39. Capacitors 38 and 39 in effect form negative feedback paths in the push-pull amplifier stage permitting the phase shift characteristics of the amplifier to be varied in accordance with the value of capacitor selected. By proper choice of the value of capacitors 38 and 39, therefore, and/or adjustment of the position of pole structure 49, the free running frequency of the oscillator, with the motor load applied, may be adjusted very closely to 60 cycles. This will permit the oscillator to be locked in at 60 cycles with a relatively small synchronizing signal applied across terminals 25 and 26.

No doubt other means for controlling the natural frequency of the oscillator will occur to those skilled in the art, such as, for example, the introduction of a controlled phase shift in the feedback path from the motor. Therefore, it should be understood that the means employed in Fig. 1 and described above are merely illustrative.

Various other modifications within the spirit and scope of the invention, such as, for example, the use of vacuum tubes in place of transistors, will no doubt likewise occur to those skilled in the art so that the invention should not be deemed to be limited to the precise embodiment illustrated but only by the scope of the appended claims.

What I claim as new and desire to secure by Letters Patent of the United States is:

1. Oscillatory electronic apparatus for powering a synchronous alternating current motor, said apparatus comprising a feedback oscillator coupled to said synchronous alternating current motor, said feedback oscillator being provided with first feedback means to cause oscillation at a relatively low frequency to start the motor, means to derive a signal whose frequency is determined by the speed of the motor, and second feedback means to the oscillator for said signal to cause the oscillator frequency to increase once the motor has started until an equilibrium frequency is reached corresponding to the desired speed of the motor.

2. Apparatus according to claim 1 wherein said second named means comprises a feedback winding and a pole structure magnetically coupling said feedback winding to the rotor of the motor.

3. Oscillatory electronic apparatus for powering a synchronous alternating current motor, said apparatus comprising an oscillator having an input circuit, an output circuit coupled to the motor, and a first feedback circuit between said output circuit and said input circuit to impress on said input circuit a first signal derived from said output circuit to cause the apparatus to undergo oscillation at a relatively low frequency to start the motor, means to derive a second signal whose frequency is determined by the speed of the motor, and a second feedback circuit to impress said second signal on said input circuit to cause the frequency of oscillation to increase once the motor has started until an equilibrium frequency is reached corresponding to the desired speed of the motor.

4. Oscillatory electronic apparatus for powering a synchronous alternating current motor having a permanent magnet rotor, said apparatus comprising an oscillator having an input circuit, an output circuit coupled to the motor, and a first feedback circuit between said output circuit and said input circuit to impress on said input circuit a first signal derived from said output circuit to cause the apparatus to undergo oscillation at a relatively low frequency to start the motor, a feedback winding, a pole structure magnetically coupling said feedback winding to the rotor of the motor to induce in said feedback winding a second signal having a frequency corresponding to the speed of the motor, and a second feedback circuit to impress said second signal on said input circuit to cause the frequency of oscillation to increase once the motor has started until an equilibrium frequency is reached corresponding to the desired speed of the motor, said first and second signals aiding one another for one direction of rotation of the rotor only to cause the motor to start unidirectionally.

5. Oscillatory electronic apparatus for operating an alternating current motor at a synchronous speed corresponding to the frequency of a synchronizing signal, said apparatus comprising a feedback oscillator having an input circuit to which said synchronizing signal is applied, an output circuit coupled to the motor, and a first feedback circuit between said output circuit and said input circuit to impress on said input circuit a first feedback signal derived from said output circuit to cause the apparatus to undergo oscillation at a relatively low frequency to start the motor, means to derive a second feedback signal whose frequency is determined by the speed of the motor, and a second feedback circuit to impress said second signal on said input circuit to cause the frequency of oscillation to increase once the motor has started until it reaches the frequency of said synchronizing signal, said first and second signals aiding one another for one direction of rotation of the rotor only to cause the motor to start unidirectionally.

6. Apparatus according to claim 5 wherein said first-named means comprises a feedback winding, and a pole structure magnetically coupling said feedback winding to the rotor of the motor.

7. Apparatus for powering a clock and for synchronizing the clock with a synchronizing signal derived by cordless means from commercially supplied alternating current, said apparatus comprising an oscillator having an input circuit to which said signal is applied and an output circuit, a synchronous alternating current motor having a permanent magnet rotor and a stator field winding coupled to said output circuit, first feedback means in said oscillator to cause oscillation at a relatively low frequency to start the motor, a feedback winding, a pole structure magnetically coupling said feedback winding to the rotor of the motor so as to induce in said feedback winding a signal whose frequency corresponds to the speed of the motor, and second feedback means to the oscillator for said last-named signal to increase the frequency of oscillation once the motor has started until a frequency equal to the frequency of said first-named signal is reached.

8. Apparatus according to claim 7, wherein said pole structure is so oriented as to minimize mutual coupling between said feedback winding and said field winding.

9. Apparatus for powering a clock and for synchronizing the clock with a synchronizing signal derived by cordless means from commercially supplying alternating current, said apparatus comprising a battery operated transistor oscillator having a phase inverter stage to which said signal is applied, a push-pull amplifier stage, and a first feedback circuit from said push-pull stage to said phase inverter stage to produce oscillations of relatively low frequency, a synchronous alternating current motor having a permanent magnet rotor and a stator field winding coupled to said push-pull stage, a feedback winding, a pole structure magnetically coupling said feedback winding to the rotor of the motor so as to induce in said feed back winding a signal whose frequency corresponds to the speed of the motor, and a second feedback circuit from said feedback winding to said phase inverter stage to increase the frequency of oscillation once the motor has started until a frequency equal to the frequency of said first-named signal is reached.

References Cited in the file of this patent

UNITED STATES PATENTS

| | | |
|---|---|---|
| 2,415,405 | Barney | Feb. 11, 1947 |
| 2,719,944 | Brailsford | Oct. 4, 1955 |